(12) United States Patent
Funk et al.

(10) Patent No.: US 6,721,633 B2
(45) Date of Patent: Apr. 13, 2004

(54) METHOD AND DEVICE FOR INTERFACING A DRIVER INFORMATION SYSTEM USING A VOICE PORTAL SERVER

(75) Inventors: Karsten Funk, Mountain View, CA (US); Andreas Kynast, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/087,589

(22) Filed: Mar. 1, 2002

(65) Prior Publication Data

US 2003/0065427 A1 Apr. 3, 2003

Related U.S. Application Data

(63) Continuation-in-part of application No. 09/967,729, filed on Sep. 28, 2001.

(51) Int. Cl.$^7$ ................................................ H04Q 7/20
(52) U.S. Cl. ............................ 701/1; 701/201; 701/211
(58) Field of Search ................................ 701/207–213, 701/200, 201, 1; 342/357.1, 357.08; 455/456

(56) References Cited

U.S. PATENT DOCUMENTS

| | | | |
|---|---|---|---|
| 4,827,520 A | | 5/1989 | Zeinstra |
| 6,064,323 A | | 5/2000 | Ishii et al. |
| 6,393,292 B1 | * | 5/2002 | Lin ........................... 455/456 |
| 6,438,382 B1 | * | 8/2002 | Boesch et al. ............ 342/357.1 |

FOREIGN PATENT DOCUMENTS

| | | |
|---|---|---|
| EP | 1 118 837 | 7/2001 |
| EP | 1 156 464 | 11/2001 |
| EP | 1 178 656 | 2/2002 |
| FR | 2 762 906 | 11/1998 |
| WO | WO 98/45823 | 10/1998 |

OTHER PUBLICATIONS

Scott Carlson et al., "Application of Speech Recognition Technology To ITS Advanced Traveler Information Systems," Pacific Rim Transtech Conference, Vehicle Navigation and Information Systems Conference Proceedings, Washington, Jul. 30–Aug. 2, 1995, IEEE, New York, U.S., vol. Conf. 6, Jul. 30, 1995, pp. 118–125.

* cited by examiner

Primary Examiner—Richard M. Camby
(74) Attorney, Agent, or Firm—Kenyon & Kenyon (57) ABSTRACT

System for interfacing a device onboard a vehicle and a voice portal server external to the vehicle including a voice communicator and a data communicator situated in the vehicle. The onboard device communicates electronically with the voice communicator and/or the data communicator which in turn are able to communicate wirelessly with a base station. The base station communicates electronically with the voice portal server. A method of providing information to an occupant of a vehicle includes providing a voice communicator, a data communicator, an onboard device, a base station, and a voice portal server. The voice portal server communicates electronically with the base station, the base station communicates wirelessly with the voice communicator and/or the data communicator, and the onboard device communicates electronically with the voice communicator and/or the data communicator. The occupant communicates a request for information via the voice communicator and via the base station to the voice portal server. The voice portal server communicates an information match via the base station and via the data communicator and/or the voice communicator. A vehicle navigation apparatus including a voice communicator, a data communicator, and an onboard device situated in a vehicle. The onboard device is electrically coupled to the voice communicator and the data communicator and communicates wirelessly with a base station which electronically communicates with a voice portal server to provide information to the occupant of the vehicle.

46 Claims, 6 Drawing Sheets

METHOD AND DEVICE FOR INTERFACING A DRIVER INFORMATION SYSTEM USING A VOICE PORTAL SERVER

RELATED APPLICATIONS

This application is a continuation-in-part of application Ser. No. 09/967,729, filed on Sep. 28, 2001.

FIELD OF THE INVENTION

The present invention generally regards interfacing a driver information system using a voice portal server. More particularly, the present invention regards a method and system for using a voice channel and a data channel linking an onboard device to an offboard voice portal server for the purpose of obtaining navigation information and other information.

BACKGROUND INFORMATION

There is an increasing effort to make Internet access available for a mobile user. There are also concerns about distracting a driver with information overload. Although there are many safety guidelines for driving, one minimal requirement is "hands on the wheel, eyes on the road." This rule suggests the use of speech to interact with information systems. Many developers have pursued voice-enabled systems, however there have been no break-throughs and costs remain high and in many cases quality remains low due to poor recognition rates and/or small vocabularies. Poor recognition rates are due in part to the enormous vocabularies which need to be recognized. For example, a navigation system must be able to recognize any given address as input, which can lead to several tens of thousands of words. The handling of this large database requires large computational power in each mobile unit which leads to significantly higher costs. Besides the high costs, the information accessible through those kinds of stand-alone systems is only as accurate as the information actually stored within the unit. The mobile unit may not be able to be updated frequently with changes like traffic situations, constructions sites, restaurants opening/closing, etc. Therefore, stand-alone systems necessarily suffer some degree of inaccuracy.

Several voice-based services on the market offer Internet-based content over the phone, for example BeVocal.com and TellMe.com. These Voice Portal services are completely automated. The user is guided to the information by following a voice dialogue, i.e. the Voice Portal offers choices the user can access using keywords. Accessing a Voice Portal requires only a phone. All the processing, such as speech recognition, content processing, and text-to-speech conversion will be done on a dedicated server at a service center. This server will not only supply the voice interface but also serves as a gateway to the Internet with its concurrent, up-to-date information. In addition, it is easy to switch to the language in which the user is most comfortable. Even within an ongoing dialogue, it is possible to switch languages due to the potential power of the Voice Portal server and the potential extent of the Voice Portal database.

However, using a Voice Portal server from a mobile unit may still be limited by the use of a single voice channel to communicate both voice and data. What is needed is a method for efficiently providing a high quality voice recognition system for a user, exporting data from onboard systems, transferring data to onboard systems, and communicating audible information to the user, all within a user interface that quickly and seamlessly responds to the user's queries and responses.

SUMMARY OF THE INVENTION

A system and method for combining an onboard mobile unit with a powerful off-board voice portal server is provided. This invention describes a way to advantageously combine the onboard mobile unit with a powerful off-board voice portal server and a way to advantageously combine a voice dialogue with data transfer. A system for interfacing an onboard device situated in a vehicle and a voice portal server includes a voice communicator and a data communicator situated in the vehicle. The onboard device communicates electronically with the voice communicator and/or the data communicator, each of which in turn communicates wirelessly with a base station. The base station communicates electronically with the voice portal server.

A method is provided for providing information to an occupant of a vehicle using a voice communicator, a data communicator, an onboard device, a base station, and a voice portal server. The voice portal server communicates electronically with the base data communicator, and the onboard device communicates electronically with the voice communicator and/or the data commnunicator. The occupant requests information via the voice communicator and via the base station from the voice portal server. The voice portal server communicates an information match via the base station and via the data communicator and/or the voice communicator.

A vehicle navigation apparatus includes a voice communicator, a data communicator, and an onboard device which are all situated in a vehicle. The onboard device is electrically coupled to the voice communicator and the data communicator and communicates wirelessly with a base station. The base station electronically communicates with a voice portal server. The apparatus provides navigation information and other information to the occupant of the vehicle.

DETAILED DESCRIPTION

The present invention is directed to the combination of a mobile unit comprising speech recognition for command and control and a voice portal server situated at a service provider. While ordinary command and control functionality of a car infotainment (infotainment=information and entertainment) device includes a very limited vocabulary, some applications might also require larger vocabularies (for example navigation applications including almost innumerable address entries, extensive personal address books, etc.). Also, the functionality of an infotainment system won't change over time, however roads, addresses, and Points-of-Interest (i.e. restaurants, gas stations, service stations, etc.) will definitely change. Therefore it makes sense to split voice-enabled functionality into basic command and control functions (available onboard) and application-based functionality (available on a powerful off-board server).

Figure 1:
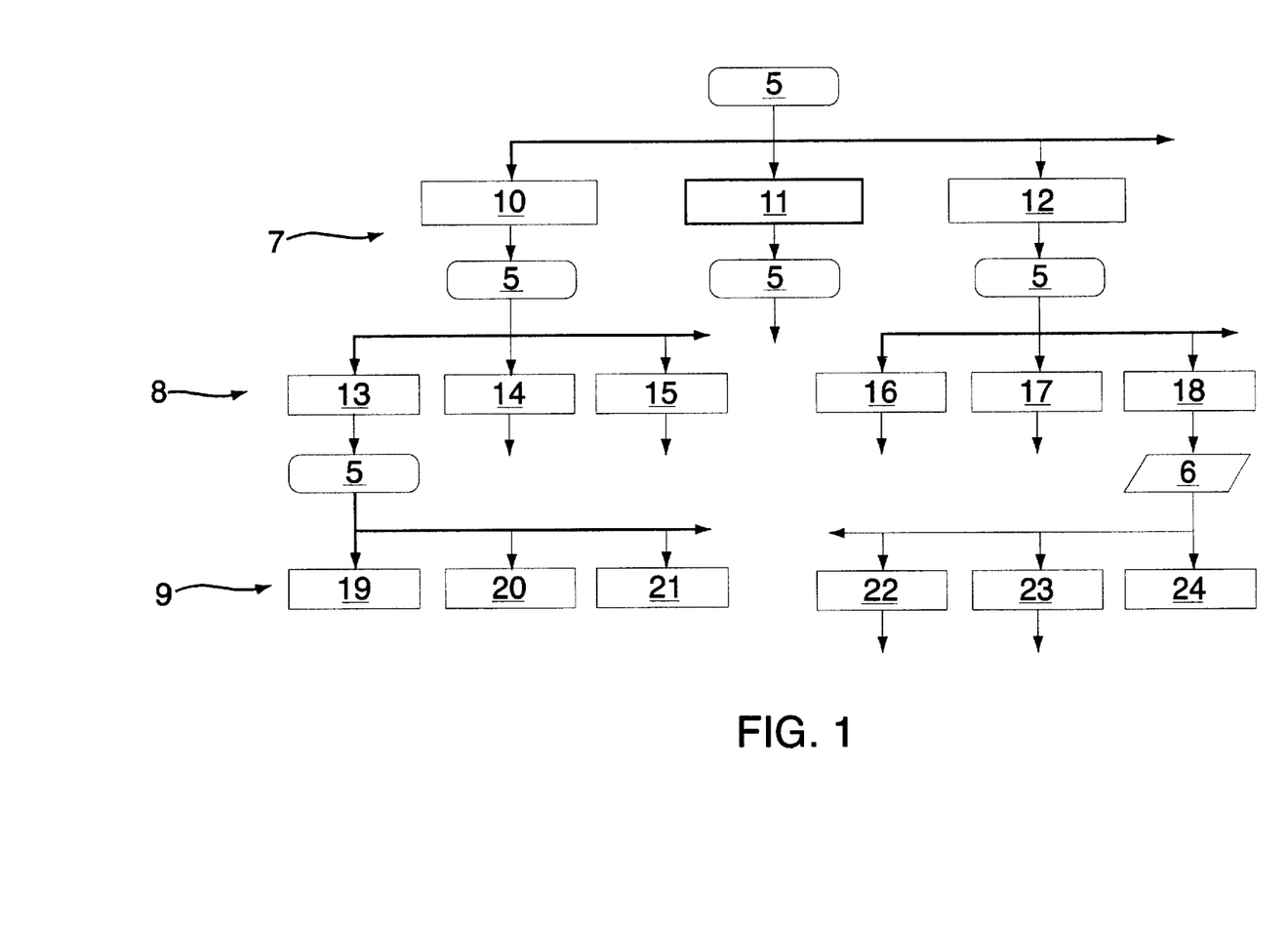
FIG. 1 illustrates diagrammatically a method of coordinating an onboard voice recognition system and an offboard voice portal server system within a mobile device.

FIG. 1 shows schematically an exemplary embodiment of the dialogue structure. Onboard speech recognition is provided for command and control (for selecting and controlling the service, for example, navigation, music, and information) and off-board speech recognition is provided for other applications (i.e. NYSE: all stock symbols; destination input: all addresses). Onboard voice recognition for command and control functions is possible in part due to the limited vocabulary necessary to operate the onboard device. This limited vocabulary requires less processing power and less expensive software to implement a voice recognition system. Maintaining command and control functions completely onboard increases the responsiveness of the onboard devices by eliminating dependence on a wireless link in the operation of the device. Off-board speech recognition for other applications is advantageous due to the large number words that must be recognized. An almost limitless number of words and numbers must be recognized by a navigation system using voice inputs for place names. Therefore, an off-board voice recognition system (for instance utilizing a voice portal server) might be utilized to enable a voice input navigation system. These two categories of functions (command/control and other applications) might be seamlessly integrated at the user level so that the occupant would not realize which voice inputs are processed onboard and which are processed offboard.

FIG. 1 shows a dialogue structure which is initiated in Box 5, which may represent activation of a PTT (Push-To-Talk) button, or may alternatively represent a hands-free command word activating the mobile unit (e.g. "Car, . . . "). Main Menu 7 is divided in this exemplary embodiment into Keywords 10, 11, and 12. As noted by the arrow extending off to the right from Main Menu 7, either more or fewer keywords may be represented in Main Menu 7. Keyword 10 in this exemplary embodiment accesses a radio function. Keyword 11 in this exemplary embodiment accesses a CD function. Alternative music functions available through Keywords 10 and 11 may include a cassette, CD magazine, MP3, or any other device or combination of devices for playing music. Keyword 12 in this exemplary embodiment accesses a navigation function which may therefore utilize any number of different navigation devices including but not limited to GPS (Global Positioning System), DGPS (Differential GPS), AGPS (Assisted GPS), cell phone-based positioning, satellite navigation, or any other navigation device or combination of navigation devices. Alternatively, different functions may be available through Keywords 10, 11, and 12, or additional keywords may be accessible, as indicated by the arrow extending off to the right above Keyword 12. An alternative or additional keyword may access an information function which may provide a variety of information to the driver in either text, image, or audible format. The information provided through an information function may include news, stock reports, weather, traffic updates, construction reports, or any other type of information desired. Each of Keywords 10, 11, and 12 may be recognizable by the mobile unit (not shown). The fixed number of Keywords 10, 11, and 12 available in Main Menu 7 enable a voice recognition system to be implemented in the mobile unit in a cost effective manner.

Submenu 8 in FIG. 1 shows how Keywords 10, 11, and 12 access different functions. The mobile unit might indicate to the occupant that Keyword 10 is active by prompting the occupant audibly (e.g. "Radio system active") or visually (e.g. with an LED screen). The flow of the dialogue from each of Keywords 10, 11, and 12 passes through a different Box 5 demonstrating an occupant action (either pushing the PTT button or prompting audibly the mobile unit). Functions 13, 14, and 15 are available through Keyword 10. Alternatively, more functions may be available through Keyword 10, as indicated by the arrow extending off to the right above Function 15. Function 13 may represent a "Tune" feature, which may access Subsubmenu 9 through Box 5. Subsubmenu 9 accessible through Function 13 may include several commands which are identifiable by the onboard recognition system. Command 19 of Function 13 may be "tune up" or alternatively, "tune down." Command 20 of Function 13 may be "next," indicating that the radio should tune to the next preset or next identifiable radio station. Command 21 may allow direct tuning of a radio station by the occupant stating the frequency to which the radio should be tuned (e.g. 102.1 MHz). Alternatively, more commands may be available through Function 13, as indicated by the arrow extending off to the right above Command 21. Function 14 may represent a "band" function, enabling the user to change between FM and AM with a simple word command recognized by the onboard device. Function 15 may represent a volume command (e.g "volume up", "volume down") which might be recognized by the onboard device.

Keyword 11 may access functions (not shown) in Submenu 8, which may in turn access commands (not shown) in Subsubmenu 9. In this exemplary embodiment, in which Keyword 11 utilizes a CD function, functions in Submenu 8 for Keyword 11 may include onboard voice recognition systems (not shown) for command and control functions (e.g. "play CD", "track 6", "volume up", etc.). Alternatively, Keyword 11 may be operable by buttons and dials alone in a similar fashion to traditional automobile CD systems. In alternative exemplary embodiments, Keyword 11 may utilize an online music file storage and retrieval program. Functions in Submenu 8 for Keyword 11 may therefore access offboard voice recognition systems (not shown) for other music commands (e.g. "play song X", "play album Y", etc.).

Keyword 12 may access Functions 16, 17, and 18 in Submenu 8 through Box 5. In this exemplary embodiment, in which Keyword 12 utilizes a navigation device, Functions 16 and 17 represents different settings for Keyword 12 and may include any number of different command and control functions for a navigation device, including but not limited to positioning mode, navigating mode, zoom-in, zoom-out, overhead view, driver perspective, map, or any number of other preprogrammed functions. Functions 16 and 17 may access a voice recognition system onboard the vehicle due to the limited vocabulary necessary to operate the different preprogrammed functions available in Functions 16 and 17. Function 18 accessible through Keyword 12 may represent a destination input function. Function 18 accesses Voice Portal Access 6 when going to the level of Subsubmenu 9.

Voice Portal Access 6 accesses a voice portal server (not shown) for offboard voice recognition. This server-based voice recognition system is necessary due to the large vocabulary needed to identify an address or place that is verbally input. Accessible through Function 18 and Voice Portal Access 6 may be Commands 22, 23, and 24. Command 23 may be, for example, an address command, which may provide the address for any residence or business name input by the occupant. Command 23 may be, for example, a POI (point of interest) command, which may provide points of interest in the vicinity of the user or in close proximity to the selected route of the occupant. Command 24 may be, for example, a command which accesses recent locations or recent searches conducted by the occupant. In this way, the occupant might be able to keep a log of common destinations and thereby access the most efficient route to a familiar destination from an unfamiliar location, or alternatively, the most efficient route taking into account local traffic and construction conditions. Alternative embodiments of these commands available on Subsubmenu 9 accessing a voice portal server are also possible. Additional commands might also be available through Function 18, as indicated by the arrow extending off to the left above Command 22.

Alternative keywords in Main Menu 7 may include an information keyword (not shown). An information keyword may access a weather function in Submenu 8, which may in turn access an offboard server for recognition of various place names and numerous weather inquiries (e.g. "What temperature is it in London?", "What is the average rainfall in July in San Diego?", etc.). Additionally, some weather inquiries may be recognized by an onboard voice-recognition system (not shown) for locally available information (e.g. "What is the temperature outside?", etc.). An information keyword may also access a financial information function in Submenu 8, which may in turn access an offboard server for recognition of various company names and different investment data (e.g. "What is the current price of company Z?", "Which mutual funds hold stock in company Z?", etc.).

Figure 2:
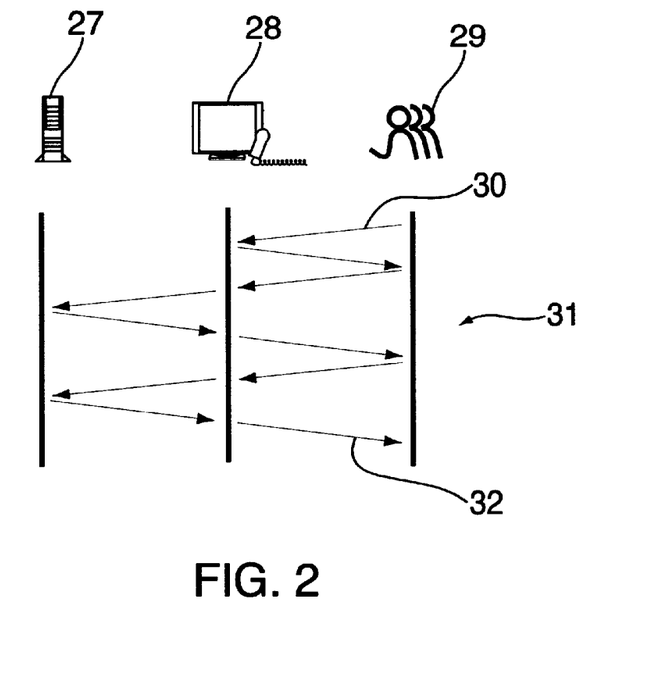
FIG. 2 illustrates diagrammatically a flow of communication between a user, a car device, and a voice portal server.

The dialogue can be broken into several parts switching back and forth seamlessly between onboard command and control and off-board applications as shown in FIG. 2. FIG. 2 shows a distributed dialogue in which User 29 initiates a dialogue by selecting an application and making Request 30. Thereafter, Mobile Unit 28 expedites a call to Voice Portal 27. User 29 responds to interrogatories from Voice Portal 27, which together form Dialogue 31. Dialogue 31 leads toward Result 32 which is given to Mobile Unit 28. Another inquiry may then be initiated by User 29 with another Request 30, which again might be handled by Voice Portal 27. An exemplary embodiment of the system of FIG. 2 might involve a brokerage service in which User 29 might state as Request 30 to Mobile Device 28 "get me a stock quote for company Z."

An example of this scenario could be as follows. User 29 wants to go to a restaurant. User 29 activates the onboard function "Information" of Mobile Unit 28 by asking for "information." Mobile Unit 28 recognizes the command and control function "information" with an onboard voice recognition system and responds to User 29 with an autoreply asking "what type of information?" When User 29 responds to the autoreply by saying "restaurant information," Mobile Unit 28 recognizes the need to access the off-board voice portal server and calls seamlessly Voice Portal 27 and forwards User 29's request for "restaurant information." Voice Portal 27 guides User 29 through Dialogue 31 resulting in Result 32, which is a particular restaurant. Voice Portal 27 gives as Result 32 the name and address of this restaurant back to Mobile Unit 28. This information may simply be delivered audibly to User 29, or may also be given as a position in electronic form to a navigation device within Mobile Unit 28. Mobile Unit 28 may therefore be able to provide more information to User 29 by combining the electronic position data for the restaurant with the current position data for the vehicle (e.g. distance, estimated travel time, directions). If User 29 decides to fill up the car en-route, Mobile Unit 28 again utilizes Voice Portal 27 to find a gas station on the route. Voice Portal 27 may then use a current position transferred from the navigation device within Mobile Unit 28, along with the destination position (either stored from the recent dialogue or also transferred from Mobile Unit 28), and the request as recognized in the off-board voice recognition system (e.g. "Find a gas station enroute") to determine the best gas station on the route. This gas station request may also be qualified in any number of ways (e.g. "Service station brand A," "Cheapest gas," "gas station closest to the highway," "gas station closest to the destination," etc.) Voice Portal 27 then gives back the name and address of the gas station, again either purely audibly or both audibly and electronically to the navigation device of Mobile Unit 28. Mobile Unit 28 may then calculate a new route based on the electronic position of the requested deviation.

The invention provides a way to advantageously combine a voice dialogue with a data transfer in order to make a voice dialogue shorter and easier. Transmitting data before, during, or after interfacing the voice portal gives additional information about the driver location and situation context, which can shorten the voice portal dialogue dramatically. If, for example, the position of the driver is automatically sent during initiating the call, there is no need to require the user to specify the location verbally.

Figure 3:
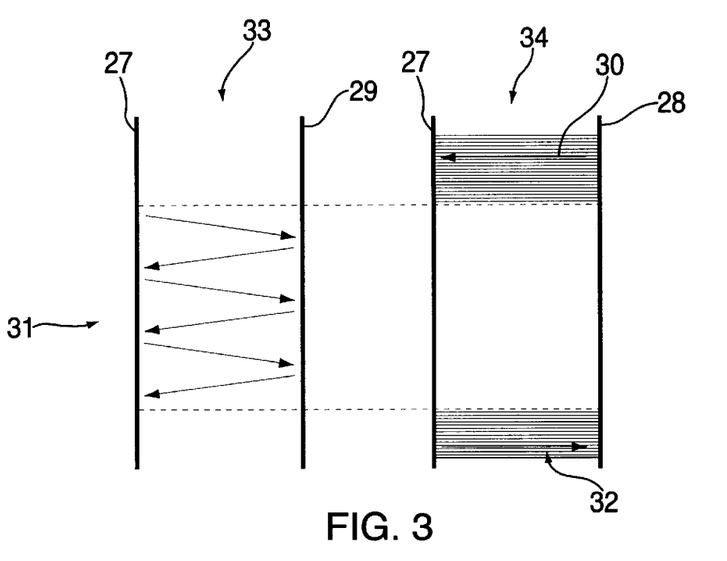
FIG. 3 illustrates diagrammatically a flow of communication between a user and a voice portal server over a voice channel and a simultaneous flow of communication between an onboard device and a voice portal server over a data channel.

FIG. 3 shows a combined voice and data dialogue. Mobile Unit 28 initiates a dialogue with Request 30 over Data Channel 34. Request 30 includes, for example, the kind of service desired by User 29 and the GPS position. Voice Portal 27 starts Dialogue 31 with User 29 over Voice Channel 33 to evaluate Request 30. When Dialogue 31 has led to Result 32, Dialogue 31 finishes, and Voice Portal 27 sends Result 32 in the form of data to Mobile Unit 28 over Data Channel 34.

An example for the scenario shown in FIG. 3 could proceed as follows. User 29 wants to go to a movie-theater. User 29 pushes a button of the driver information system, which sends Request 30 (for example using GSM-SMS or any other system providing a data channel) to Voice Portal 27 over Data Channel 34. Request 30 includes the kind of service (e.g. "Search for movie theaters") and the GPS position of Mobile Unit 28. After receiving the data, Voice Portal 27 starts Dialogue 31 in order to find out the exact user desire (e.g. "What kind of movie").

Since Voice Portal 27 has received the GPS position included in initial Request 30, Voice Portal 27 does not need to ask for the current user position from User 29. After Dialogue 31 results in a set of data (i.e. name and address of selected movie theater), Voice Portal 27 finishes Dialogue 31 and sends the data in the form of Result 32 over Data Channel 34 to Mobile Unit 28. Since Result 32 includes an electronic data position of the movie theater, the onboard navigation system within Mobile Unit 28 can calculate a route and start route guidance.

Figure 4:
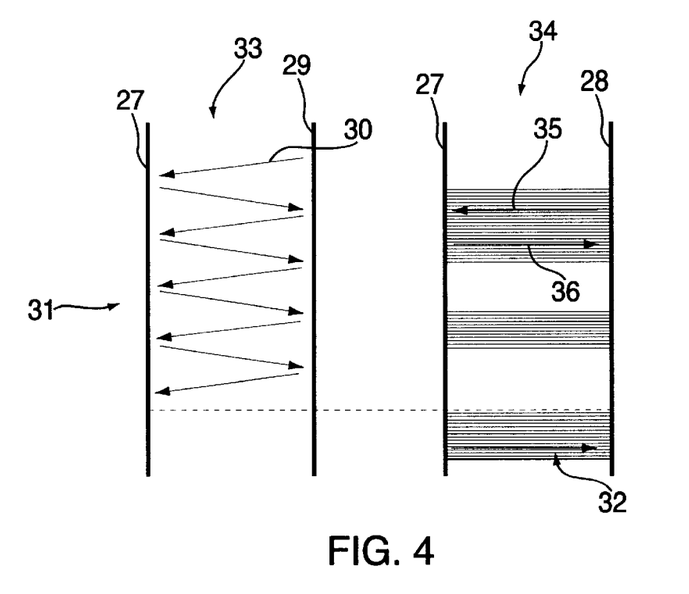
FIG. 4 illustrates diagrammatically another embodiment of the the flow of communication between a user and a voice portal server over a voice channel and a simultaneous flow of communication between an onboard device and a voice portal server over a data channel.

FIG. 4 shows another example of a combined voice and data dialogue. An example might be that User 29 wants to go to a movie theater. User 29 might initiate Dialogue 31 with Request 30 to Voice Portal 27 made over Voice Channel 33. Voice Portal 27 guides User 29 through Dialogue 31 resulting in a particular movie theater corresponding to Result 32. During Dialogue 31, Voice Portal 27 may require a position for User 29 in order to make a selection during one of the next steps (e.g. to reduce the number of possible matches for Request 30 by eliminating matches that are greater than a predetermined distance from the current position of User 29). In this situation, Voice Portal 27 might transmit Data Request 35 to Mobile Unit 28 over Data Channel 34. Mobile Unit 28 might thereafter respond by transmitting Data 36 to Voice Portal 27 over Voice Channel 34. After getting Data 36 corresponding to current position information of the vehicle, Voice Portal 27 can modify the dialogue structure by eliminating from the set of possible matches for Request 30 matches with corresponding physical locations greater than a predetermined maximum distance from the current location. This predetermined maximum distance may be preset or may be modified by the user at any time (e.g. "Which dry cleaners are within 10 minutes from here?", etc.), or may be the subject of Dialogue 31 in the form of an inquiry from Voice Portal 31 (e.g. "There are better prices for the goods you want to purchase at distances greater than 30 miles; Are you willing to increase the maximum distance from 30 miles to 50 miles?"). Additionally, distance may provide the strategy for reducing the possible matches for Request 30 to one possible match (e.g. "Do you want the closest to your current location?", or "Do you want to minimize deviation from the currently selected route?").

During Dialogue 31, it is possible to send Information 37 corresponding to the status of Dialogue 31 to Mobile Unit 28 which can in turn provide Information 37 to User 29 through a visual or audible display. In one exemplary embodiment, Information 37 may show the categories and sub-categories currently available in the selecting process defined by Dialogue 31 (e.g. "Movie Theater—San Francisco—Movies Today"). Alternatively, Information 37 may show a variable bar display indicating an estimated percentage of Dialogue 31 completed until Result 32 is expected (i.e. a display showing the rate of progress of Dialogue 31 in narrowing possible matches for Request 30 to a single Result 32). After Dialogue 31 results in a set of data (i.e. name and address of selected movie theater) represented by Result 32, Voice Portal 27 finishes Dialogue 31 and sends Result 32 over Data Channel 34 to Mobile Unit 28. Since the address includes also an electronically readable position of the movie theater, the onboard navigation system included in Mobile Unit 28 can calculate a route and start route guidance.

Another exemplary embodiment for the combined voice and data dialogue of FIG. 4 is illustrated by the following scenario. Request 30 from User 29 corresponds to a request for a vehicle status check from Mobile Unit 28 (e.g "Does the car need a check-up?", "I'm not getting enough power", "What's that noise under the hood?", etc.). The number of variations in the phrasing of Request 30 may require that Mobile Unit 28 communicate the request to Voice Portal 27 via Voice Channel 33. Voice Portal 27 can ascertain the request using a database and/or the Internet in conjunction with voice recognition software. Upon clarifying the request for a vehicle system check, Voice Portal 27 might communicate an electronic vehicle status inquiry in the form of Data Request 35 to Mobile Unit 28 over Data Channel 34. Data Request 35 may be a specific vehicle sensor inquiry or may be a command to send all current and/or all saved or time-averaged vehicle sensor data. Mobile Unit 28 may then respond over Data Channel 34 to Voice Portal 27 with Data 36 corresponding to the vehicle sensor data requested. Voice Portal 27 may then proceed with an analysis of Data 36, or may communicate the data over the Internet (not shown), or another network (not shown), to any of the manufacturer's computer, the dealer's computer, the vehicle owner's chosen service station's computer, a specialized subscription service, or any other computer-networked analytical system (not shown).

Whatever system analyzes Data 36 may respond via Voice Portal 27 to Mobile Unit 28 by Information 37 which may be an instruction to adjust any number of electronically adjustable engine settings (e.g. fuel/air mixture, etc.). Alternatively, another Data Request 35 may be sent to Mobile Unit 28 to obtain more information. Result 32 sent from the analytical system may indicate that a professional service is necessary. Result 32 may also indicate a priority consisting of either immediate service required, service this week, or service this month. Additionally, Voice Portal 27 may choose a service center based on the priority of the service and a proximity to the current location if the service is immediately necessary, or may start an inquiry with User 29 concerning scheduling a service later in the week. After Dialogue 31 obtains a target service time, Voice Portal 27 may again access the Internet or other network to schedule the service. After scheduling the service, Voice Portal 27 may communicate the scheduled time to Mobile Unit 28 in the form of Result 32 over Data Channel 34, which may in turn inform User 27 as well as set a reminder to remind User 27 on the day of the schedule service and/or within a prescribed time before the service.

Alternatively, this last scenario may be prompted not by an inquiry from the occupant, but instead may be initiated by Mobile Unit 28 upon recognition of a sensor value that indicates that either service is required or more investigation is necessary, or by Mobile Unit 28 at the completion of a set period, which may be either time-based (e.g. one month, etc.), mileage-based (e.g. 5000 miles), or based on any number of other criteria. In a third alternative, an inquiry into the vehicle status may be by Voice Portal 27 which may communicate electronically with either the dealer, the manufacturer, the owner's service station, any other third party with authorization from the vehicle owner, or any combination of the above. These third party inquiries may also be at a set interval (e.g. every 3 months since the sale of the vehicle, one month since the last service, etc.) or may be in response to a particular situation justifying a status inquiry (e.g. a vehicle recall, a specific part failure, an update in a program code for an onboard computer).

Figure 5:
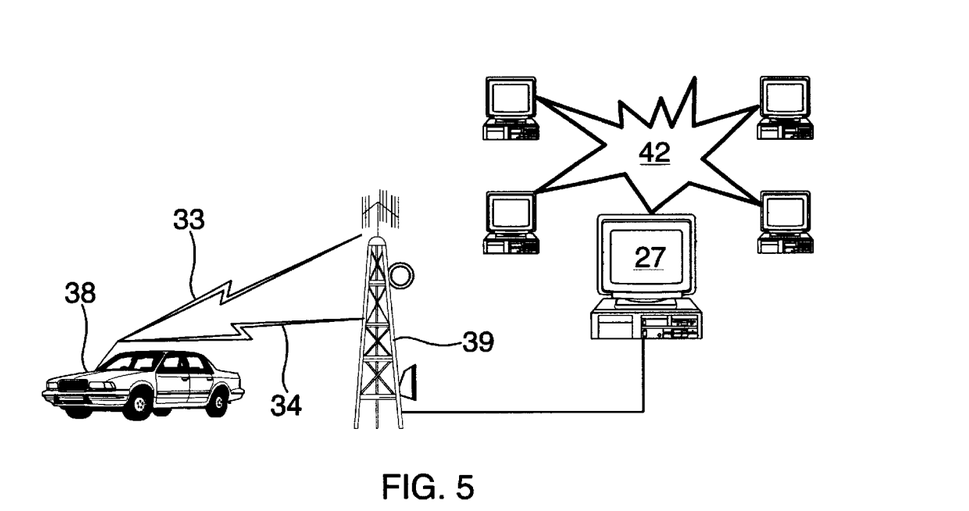
FIG. 5 is a schematic representation of an embodiment of the navigation system of the present invention showing the vehicle and the system external to the vehicle.

Referring to FIG. 5, Voice Portal 27 is accessible from Mobile Unit (not shown) in Vehicle 38 via Voice Channel 33 and Data Channel 34 and via Base Station 39. Voice Portal 27 is able to access Internet 42 to obtain additional information. The system may allow the occupant (not shown) to request over Voice Channel 33 to Base Station 39, and from there to Voice Portal 27, a destination location, for instance. The system may provide for Voice Portal 27 to implement a voice recognition algorithm to produce a set of possible matches for the requested destination location. Voice Portal 27 may connect to Internet 42 to access information from both public and private databases concerning requested locations, traffic, weather, or any other useful information. By outsourcing the voice recognition software and hardware to Voice Portal 27 external to Vehicle 38, the cost of implementing the voice input system is reduced and improved voice recognition systems can be implemented with greater ease. Additionally, the most up-to-date information regarding traffic, construction, and weather conditions, as well as restaurant openings and closings and other dynamic information (e.g. movies playing and times) are available through the system to a user in Vehicle 38.

The system may additionally provide for Voice Portal 27 to reduce the number of requested destinations to one address through any of several possible methods. One method for reducing the number of matches may be to audibly prompt the occupant with each possible match until an affirmative response is registered. Alternatively, the system may prompt the occupant with questions that distinguish between sub-categories of the set of possible matches. These questions may be designed by Voice Portal 27 to reduce the number of possible matches as efficiently as possible to a smaller set of possible matches, or potentially to one possible match. A third alternative may be for the Voice Portal 27 to prompt the Mobile Unit 28 to provide a current location for Vehicle 38 over Data Channel 34, and then for Voice Portal 27 to limit the possible matches to those destination locations within a predetermined maximum distance from the current location. There might also be an override of this function to allow navigation assistance for longer drives. Some combination of these three possible methods for reducing the possible destination location matches might also be possible. After determining the destination location, Voice Portal 27 might communicate this information directly to Vehicle 38 over Data Channel 34.

Figure 6:
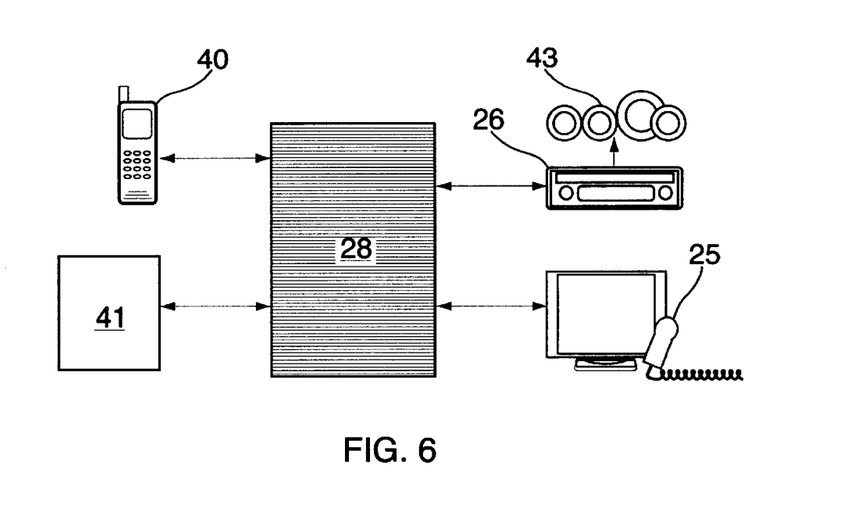
FIG. 6 is a schematic representation of an embodiment of the navigation system of the present invention showing the system internal to the vehicle.

Referring to FIG. 6, the system according to the present invention includes a Voice Communicator 40 (for instance a mobile phone) and Data Communicator 41 connected to Mobile Unit 28. Mobile Unit 28 may include Device 25 which may be a navigation device (for instance a GPS receiver) and Device 26 which may be a music system. Using the destination address transmitted by the voice portal (not shown) via Data Communicator 41, Mobile Unit 28 might calculate a route from the current position to the destination based on an algorithm that might include factors including a set of roads in a database, road construction, traffic conditions, weather conditions, and driver preferences. Current construction, traffic, and weather conditions may also be transmitted by the voice portal to Mobile Unit 28 via Data Communicator 41.

Alternatively, the voice portal may calculate a route based on current position information received from Mobile Unit 28, from the destination location determined, from construction and traffic information received from the internet (not show), and any other appropriate information. The voice portal might then transmit the entire calculated route to Mobile Unit 28, which would then guide the user to the destination along that route, unless deviating requires modifications of the route.

Device 25 might provide navigational direction from the current location to the requested destination location to the occupant by any of several possible means, including but not limited to, a visual display unit, a heads-up display, and a series of audible directions. When audible directions are provided, Device 25 would provide a series of directions from a current location to the requested destination along a selected route. Each direction would be delivered audibly at a time that would enable the occupant to act on the navigational direction.

In an exemplary embodiment, Device 25 provides the navigational direction audibly through Device 26 with Speakers 43 or a dedicated speaker (not shown). The navigational direction is delivered to the occupant at a time before the occupant needs to act on the navigational direction. The timing of the delivery of the navigational direction is determined by Device 25 and may be based on any of an instantaneous position measurement, an instantaneous heading measurement, an instantaneous velocity measurement, the requested location, and the selected route.

An exemplary embodiment may provide that Voice Communicator 40 may be a mobile telephone or any device capable of communicating wirelessly. The mobile phone may be able to be positioned in a docking unit that is part of a hands-free unit that connects the mobile phone to Speakers 43 for hands-free use. Data communicator may be any type of wireless device for communicating data and may operate within any short messaging system protocol (e.g. GSM-SMS) or any other appropriate protocol for transmitting data wirelessly.

The system of identifying requested locations by Voice Portal 27 and communicating the corresponding destination location from Voice Portal 27 to Device 25 via Data Communicator 41 allows the occupant to input a destination location to Device 25 using voice input only. Voice inputs have the advantages noted above that they do not distract the driver from the driving task, and thereby increase road safety. Device 25 can use any of, or all of, the destination location, a current position, a road/street database, and a route selection algorithm to determine a selected route. Device 25 may use any number of positioning methods to determine the current position and to monitor progress along the selected route. These positioning systems may include GPS, DGPS, AGPS, triangulation, hyperbolic intersection of time-delay solutions, and cell identification.

A significant advantage to using both Voice Communicator 40 and Data Communicator 41 to connect Mobile Unit 28 to a voice portal (not shown) is that the communication between the user (not shown) and the voice portal can be seamlessly implemented without delays or interruptions. The ongoing dialogue between the user and the voice portal to identify destinations and/or other information can continue simultaneous with communication between Mobile Unit 28 and the voice portal over Data Communicator 41 of position information, vehicle sensor information, or destination information.

Figure 7:
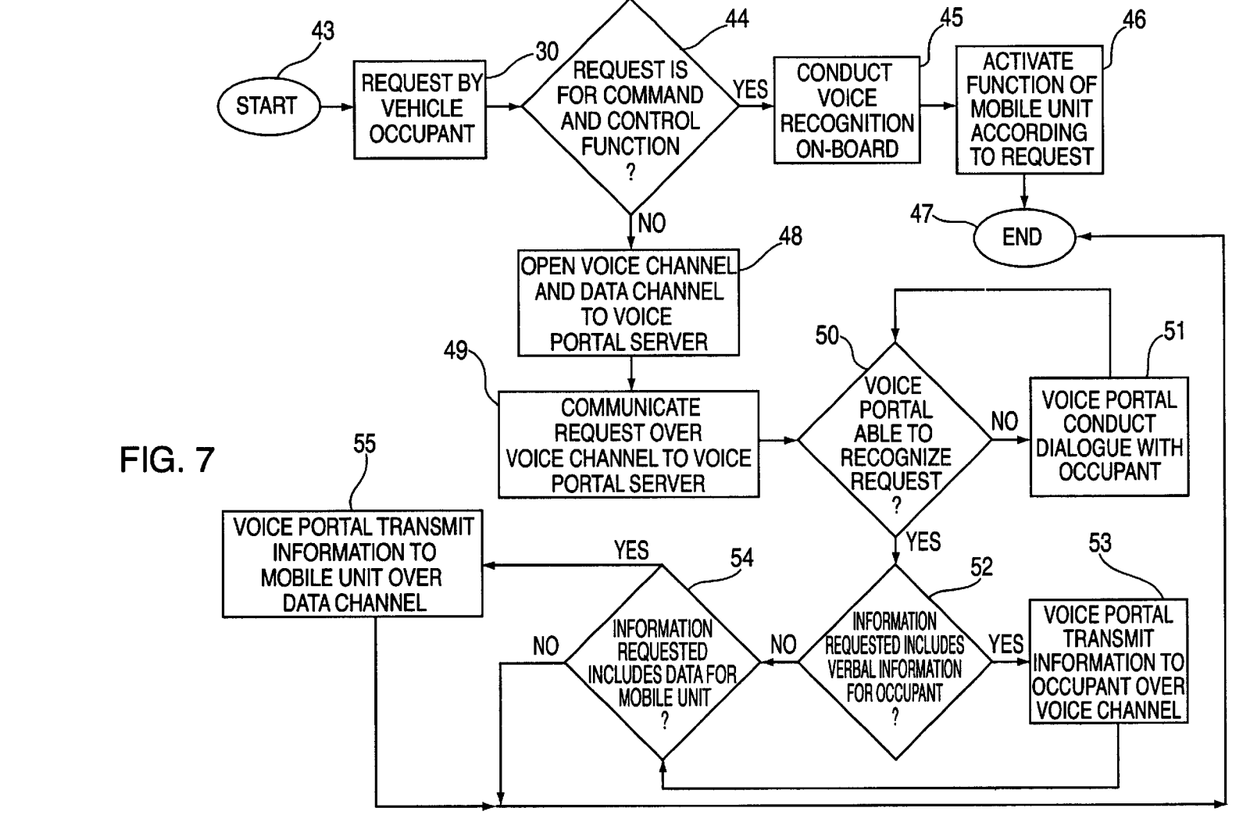
FIG. 7 is a flow chart demonstrating the method according to an embodiment of the information/navigation system of the present invention.

Referring to FIG. 7, the method according to the present invention is illustrated with a flowchart. Following Start 43, Request 30 originates with an occupant of the vehicle. Request 30 is analyzed in Diamond 44 to determine if the request is for a command and control function of the mobile unit. If Request 30 is identified as a command and control request, then in Box 45 a voice recognition application is applied onboard to Request 30 to identify the request. After Request 30 for a command and control function is identified onboard, the mobile unit then activates that command and control function in accordance with the user's desire in Box 46. If Request 30 is not for a command and control function, the mobile unit opens a voice channel and a data channel with the off-board voice portal in Box 48. After the voice and data channels are opened, Request 30 is communicated to the voice portal for voice recognition in Box 49. Diamond 50 asks whether the voice portal is able to identify the request (either for information, a destination location, or another service) without further inquiry. If further inquiry is required, a dialogue is conducted with the occupant in Box 51.

An exemplary dialogue might proceed from Request 30 consisting of "I want to go see a movie." The voice portal might inquire "Any particular movie?" The occupant might respond "Anything close and starting soon." The voice portal may then compile a list of all movie theaters within a preset distance associated with "close" which may depend on the context (city/country), the user (two different drivers with different presets for close), or from a predetermined distance (e.g. 10 miles). The voice portal may then select all movies playing at the "close" theaters that are starting in the next 30 minutes (or may use another method for defining "soon"). The voice portal may then inform the occupant of the size of the set of movies, and may offer to list them or search within them according to another criteria given from the occupant. For example the voice portal may indicate that "there are 5 movies starting within 30 minutes that are within a 10 mile radius of your current location, shall I list them?" If the list is sufficiently long that listing is inefficient, the voice portal may offer to search based on the occupant's criteria (e.g. "I want to see an action-adventure) or may offer it's own method of winnowing the set of possible matches (e.g. "There are 10 Hollywood productions and 8 foreign movies, do you want to eliminate either of these categories?").

The information identified by the voice portal may be both verbal and data. Diamond 52 asks whether verbal information is part of the response to Request 30. If there is a verbal information component, then this information is transmitted to the occupant in Box 53. Diamond 54 asks whether data is part of the response to Request 30. If there is a data component, then this information is transmitted to the mobile unit in Box 55.

Figure 8:
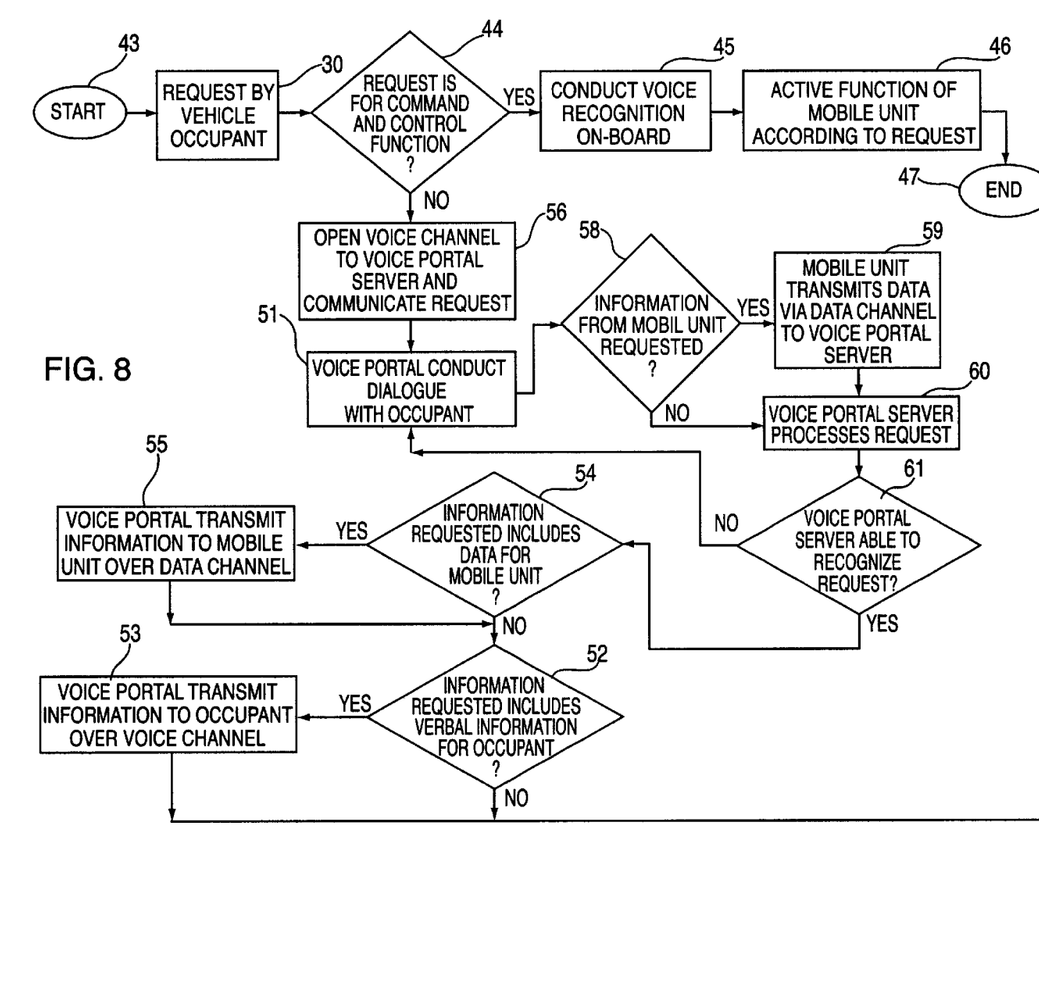
FIG. 8 is a flow chart demonstrating the method according to another embodiment of the information/navigation system of the present invention.

Referring to FIG. 8, the method according to the present invention is illustrated with another flowchart. Following Start 43, Request 30 originates with an occupant of the vehicle. Requests for command-and-control functions proceed in a similar fashion to that described in FIG. 7. However, when Request 30 is not for a command-and-control function, the flowchart proceeds to Box 56, in which a voice channel to a Voice Portal Server is opened and the request is communicated to the Voice Portal Server. In contrast to FIG. 7, a data channel is not opened to the Voice Portal Server because the data channel is open constantly. This type of communication system provides an open data channel all of the time, and the user may pay only for the data transmitted (e.g. the number of kilobytes). From Box 56, the flowchart proceeds to Box 51, which is similar to FIG. 7. From Box 51, the flowchart proceeds to Diamond 58, which asks whether information from the vehicle is requested. This illustrates the situation in which the Voice Portal Server needs information, such as a vehicle location, at the beginning, or near the beginning, of a dialogue to enable the Voice Portal Server to reduce the number of possible matches for an information request. This information from the mobile unit may also allow the Voice Portal Server to improve the efficiency of the dialogue by focusing the questions for the occupant. If information is requested from the mobile unit by the Voice Portal Server, then in Box 59 the Mobile Unit transmits data via the data channel to the Voice Portal Server. If no information is requested, or if information is requested and has been transmitted, then the flowchart proceeds to Box 60 where the Voice Portal Server processes the request. Next in the flow is Diamond 61 which asks whether the Voice Portal Server is able to recognize the request. If the Voice Portal Server is not able to recognize the request, the flow returns to Box 51. Alternatively, if the Voice Portal Server is able to recognize the request, then the flow proceeds to Diamond 54. The flow proceeds in a similar fashion to that described with respect to FIG. 7 by transmitting verbal information to the user and/or data information to the mobile unit.

A system for interfacing a driver information system using a voice portal server is provided herein. While several embodiments have been discussed, including a system utilizing a voice channel and a data channel to the voice portal server, others, within the invention's spirit and scope, are also plausible.

What is claimed is:

1. A system comprising:

a voice communicator situated in a vehicle;

a data communicator situated in the vehicle;

an onboard device situated in the vehicle and being adapted to communicate electronically with at least one of the voice communicator and the data communicator;

a base station being adapted to communicate wirelessly with at least one of the voice communicator and the data communicator; and a voice portal server being adapted to communicate electronically with the base station;

wherein the onboard device recognizes a function command communication verbally by an occupant, the function command corresponding to an onboard function of the onboard device;

wherein the onboard device actuates the onboard function in accord with the function command; and wherein the onboard device distinguishes between the funtion command and a request, the request communicated verbally by the occupant and corresponding to an offboard function.

2. The system of claim 1, wherein:

the onboard device communicates the request via the voice communicator and via the base station to the voice portal server; and the voice portal server recognizes the request and at least one of (a) communicates audible information via the base station and via the voice communicator to the occupant, and (b) communicates electronic information via the base station and via the data communicator to the onboard device.

3. The system of claim 1, wherein:

the voice communicator communicates a request from the occupant of the vehicle to the voice portal server; and the voice portal server provides information to at least one of the occupant and the onboard device, the information corresponding to the request.

4. The system of claim 3, wherein the information is provided to the occupant via the voice communicator.

5. The system of claim 3, wherein the information is provided to the onboard device via the data communicator.

6. The system of claim 3, wherein the onboard device communicates at least one of a vehicle system status and a vehicle position to the voice portal server via the data communicator.

7. The system of claim 6, wherein:

the onboard device communicates the vehicle system status to the voice portal server; and the voice portal server at least one of determines at least one suggested action step and begins a dialogue with the occupant.

8. The system of claim 7, wherein:

the voice portal server determines the at least one suggested action step; and the voice portal server communicates the at least one suggested action step to at least one of (a) the occupant via the voice communicator and (b) the onboard device via the data communicator.

9. The system of claim 8, wherein the at least one suggested action step is at least one of a service station stop, a gas station stop, and a dealer visit.

10. The system of claim 7, wherein the voice portal server begins the dialogue with the occupant via the voice communicator, the dialogue for reducing a plurality of possible information matches corresponding to the request to one possible information match.

11. The system of claim 10, wherein the voice portal server communicates the one possible information match to at least one of (a) the occupant via the voice communicator and (b) the onboard device via the data communicator.

12. The system of claim 6, wherein the onboard device communicates the vehicle position to the voice portal server and the voice portal server uses the vehicle position to reduce a number of possible information matches corresponding to the request.

13. The system of claim 12, wherein the voice portal server reduces the number of possible information matches corresponding to the request by eliminating each possible information match where a distance between a physical location associated with each possible information match and the vehicle position is greater than a predetermined maximum distance.

14. The system of claim 13, wherein the predetermined maximum distance is determined by a response from the occupant to an interrogatory from the voice portal server communicated via the voice communicator.

15. The system of claim 1, wherein the onboard device includes at least one of a navigation system, an information system, and a music system.

16. The system of claim 1, further comprising:
a speaker for communicating electronically with the onboard device, the speaker creating sound pressure waves that correspond to prompts from the voice portal server to the occupant of the vehicle; and
a microphone for communicating electronically with the onboard device, the microphone sensing sound pressure waves that correspond to responses from the occupant to the voice portal server.

17. The system of claim 16, further comprising:
a hands-free kit for communicating with the onboard device; wherein
the hands-free kit connects the voice communicator to at least one of the speaker and the microphone when the hands-free kit is connected to the onboard device.

18. The system of claim 17, wherein the hands-free kit is electrically connected to the onboard device.

19. The system of claim 19, wherein the hands-free kit communicates wirelessly with the onboard device.

20. The system of claim 16, wherein the speaker is part of a vehicle sound system.

21. The system of claim 1, wherein:
an occupant of the vehicle communicates the request via the voice communicator and the base station to the voice portal server; and
the voice portal server recognizes the request and determines at least one information match.

22. The system of claim 21, wherein:
the at least one information match includes a plurality of information matches; and
the voice portal server prompts the occupant with at least one interrogatory via the voice communicator; and
the at least one interrogatory reduces a number of the plurality of information matches to at least one of a single information match and a smaller plurality of information matches.

23. The system of claim 21, wherein the voice portal server communicates the at least one information match via the base station and via the data communicator to the onboard device.

24. The system of claim 21, wherein the voice portal server communicates the at least one information match via the base station and via the voice communicator to the occupant.

25. A method of providing information to an occupant of a vehicle, the method comprising:
providing a voice communicator;
providing a data communicator;
providing an onboard device, the onboard device communicating electronically with at least one of the voice communicator and the data communicator;
providing a base station, the base station communicating wirelessly with at least one of the voice communicator and the data communicator;
providing a voice portal server, the voice portal server communicating electronically with the base station; and
communicating verbally by the occupant at least one of (a) a request for information via the voice communicator and via the base station to the voice portal server and (b) a function command to the onboard device; and
distinguishing by the onboard device between the request for information and the function command.

26. The method of claim 25, wherein the occupant communicates the function command, and further comprising:
recognizing by the onboard device the function command, the function command corresponding to an onboard function of the onboard device; and
actuating by the onboard device the onboard function in accord with the function command.

27. The method of claim 25, wherein the occupant communicates the request for information, further comprising:
communicating an information match by the voice portal server via the base station and via at least one of (a) the data communicator to the onboard device and (b) the voice communicator to the occupant.

28. The method of claim 25, wherein the communicating an information match by the voice portal server via the base station is via the data communicator to the onboard device.

29. The method of claim 25, wherein the communicating an information match by the voice portal server via the base station is via the voice communicator to the occupant.

30. The method of claim 25, further comprising responding by the occupant to at least one interrogatory communicated by the voice portal server via the voice communicator, the at least one interrogatory for reducing a set of at least two information matches to one information match, the one information match corresponding to the request for information.

31. The method of claim 25, further comprising communicating by the onboard device to the voice portal server via the data communicator at least one of a current location of a vehicle and a current status of a vehicle system.

32. The method of claim 31, further comprising:
receiving by the voice portal server the current location of the vehicle from the onboard device;
wherein the request for information is a request for a destination location; and
wherein the voice portal server reduces a set of at least two possible destination locations based on a distance between the current location of the vehicle and each of the at least two possible destination locations by eliminating each of the at least two possible destination locations where a distance between the current location and each of the at least two possible destination locations is greater than a predetermined maximum distance.

33. The method of claim 32, further comprising determining the predetermined maximum distance by a response from the occupant to an interrogatory from the voice portal server communicated via the voice communicator.

34. The method of claim 31, further comprising:

receiving by the voice portal server the current status of a vehicle system from the onboard device, wherein the request for information is a request for a vehicle status check; and determining a vehicle manufacturer's suggested course of action, wherein the vehicle manufacturer's suggested course of action is the information match.

35. A vehicle electronic apparatus comprising:

a voice communicator situated in a vehicle;

a data communicator situated in the vehicle; and an onboard device situated in the vehicle, the onboard device electrically coupled to the voice communicator and the data communicator;

wherein the voice communicator and the data communicator are able to communicate with a base station;

wherein the base station is able to communicate with a voice portal server;

wherein the base station and the voice portal server are external to the vehicle;

wherein the onboard device recognizes at least one function command communicated verbally by an occupant, the at least one function command corresponding to at least one onboard function of the onboard device; and wherein the onboard device distinguishes between the at least one function command and a request, the request communicated verbally by the occupant and corresponding to at least one offboard function.

36. The apparatus of claim 35, wherein the onboard device actuates the at least one onboard function in accord with the at least one function command.

37. The apparatus of claim 35, wherein:

the onboard device communicates the request via the voice communicator and via the base station to the voice portal server; and the voice portal server recognizes the request and at least one of(a) communicates audible information via the base station and via the voice communicator to the occupant, and (b) communicates electronic information via the base station and via the data communicator to the onboard device.

38. The apparatus of claim 35, wherein the voice communicator and the data communicator are integrated in a communication device.

39. The apparatus of claim 35, wherein the voice communicator and the data communicator are separate communication devices.

40. The apparatus of claim 35, wherein:

the request includes a request for information;

the occupant of the vehicle communicates the request for information to the voice portal server via the voice communicator; and the voice portal server provides an information match via the data communicator to the onboard device, the information match corresponding to the request for information.

41. The apparatus of claim 40, wherein:

the onboard device provides a current location to the voice portal server;

the request for information includes a destination request; and the voice portal server uses the current location to reduce a number of possible matches for the destination request by eliminating each possible match where a distance between the current location and each location associated with each possible match for the destination request is greater than a predetermined maximum distance.

42. The apparatus of claim 41, wherein the predetermined maximum distance is determined by a response from the occupant to an interrogatory from the voice portal server communicated via the voice communicator.

43. The apparatus of claim 35, wherein the voice communicator includes a mobile telephone.

44. The apparatus of claim 35, wherein:

the request includes a request for information;

the occupant of the vehicle communicates the request for information to the voice portal server via the voice communicator; and the voice portal server provides an information match via the data communicator to the onboard device, the information match corresponding to the request for information.

45. The apparatus of claim 37, wherein the voice communicator includes a mobile telephone.

46. The apparatus of claim 37, wherein:

the request includes a request for information:

the occupant of the vehicle communicates the request for information to a voice portal server via the voice communicator; and the voice portal server creates a set of at least one information match from the request for information match corresponding to the request for information.

* * * * *